No. 763,953. PATENTED JULY 5, 1904.
W. M. BOLEN.
MACHINE FOR COLLECTING INSECTS FROM PLANTS.
APPLICATION FILED FEB. 24, 1903.
NO MODEL. 2 SHEETS—SHEET 2.
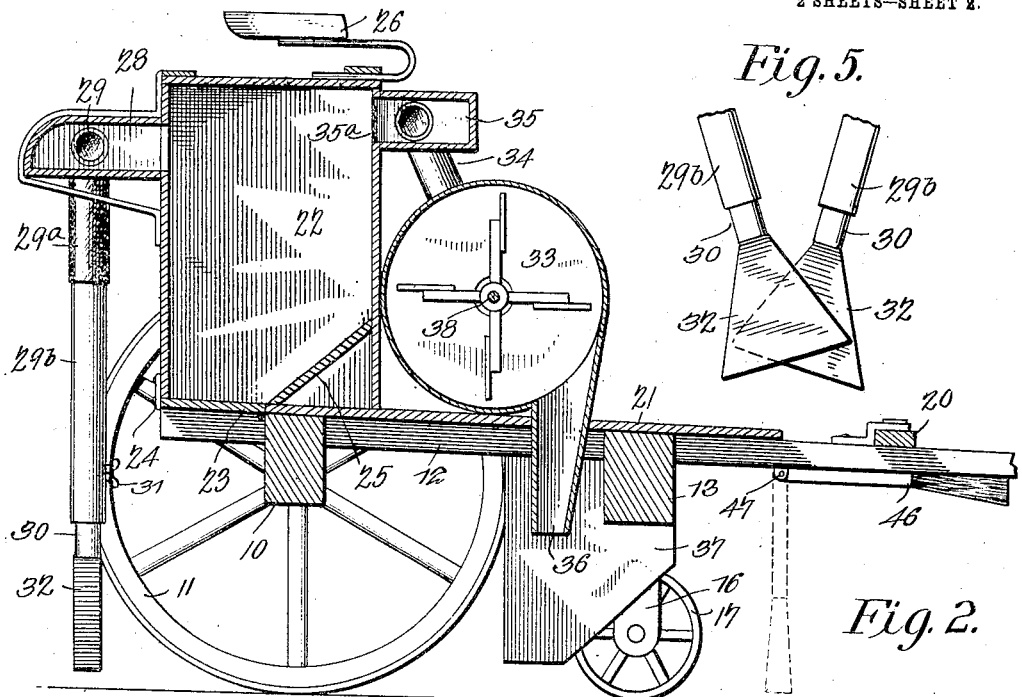
Fig. 5.
Fig. 2.
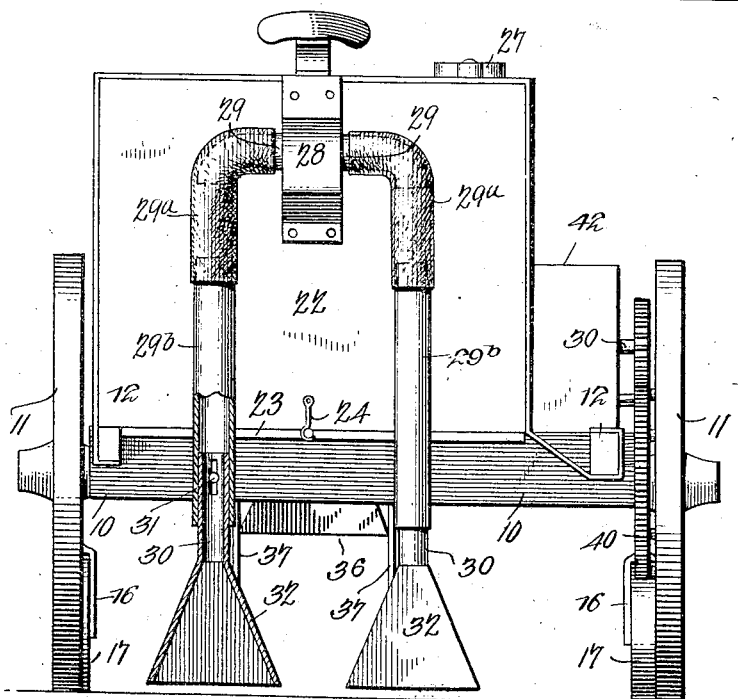
Fig. 3.
Witnesses
E. F. Stewart
C. N. Woodward
Walter M. Bolen, Inventor
by C. A. Snow & Co.
Attorneys No. 763,953.

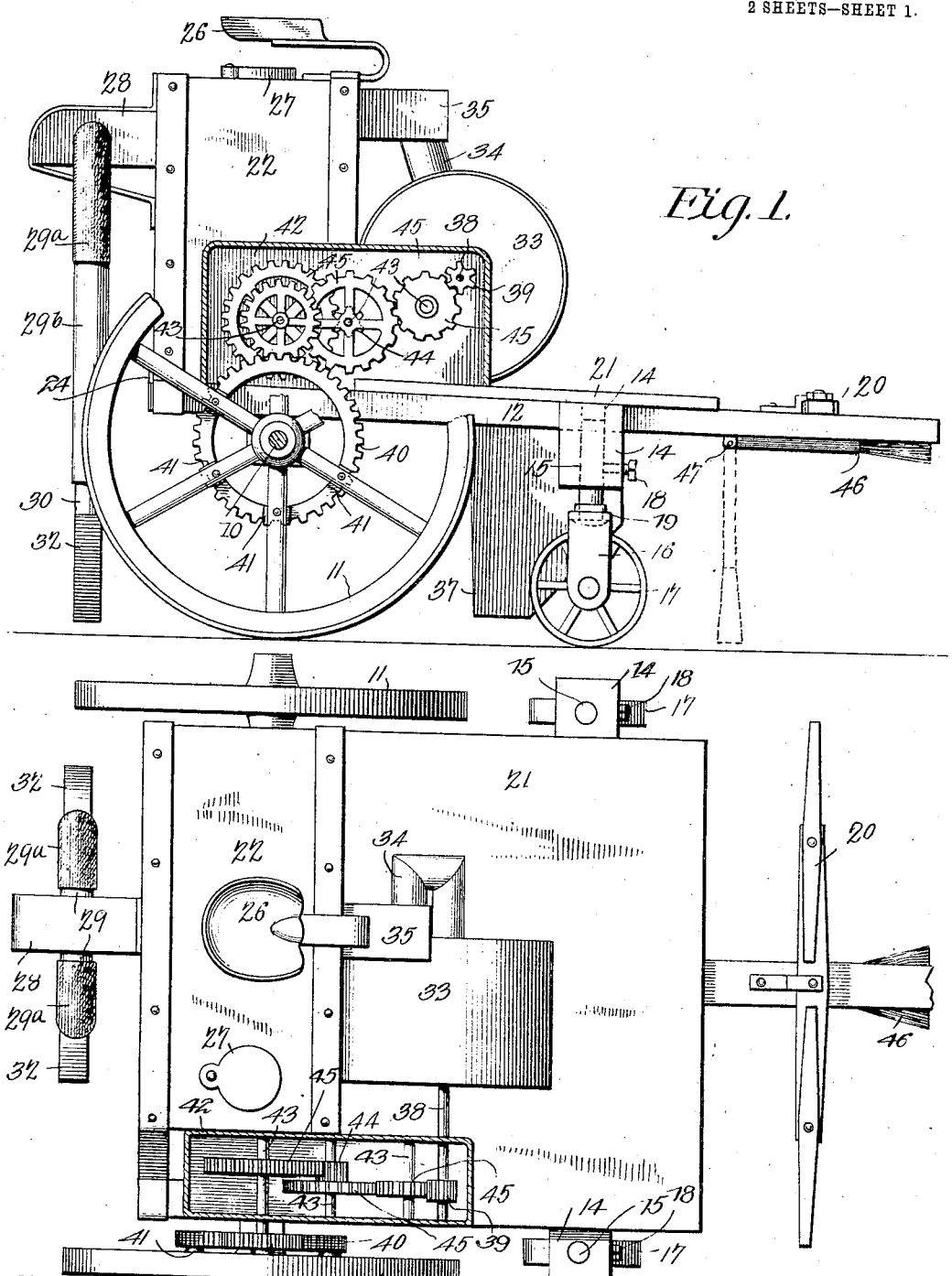

Patented July 5, 1904.

UNITED STATES PATENT OFFICE.

WALTER M. BOLEN, OF YARBROVILLE, TEXAS.

MACHINE FOR COLLECTING INSECTS FROM PLANTS.

SPECIFICATION forming part of Letters Patent No. 763,953, dated July 5, 1904.

Application filed February 24, 1903. Serial No. 144,775. (No model.)

*To all whom it may concern:*

Be it known that I, WALTER M. BOLEN, a citizen of the United States, residing at Yarbroville, in the county of Limestone and State of Texas, have invented a new and useful Machine for Collecting Insects from Plants, of which the following is a specification.

My invention relates to machines for collecting insects from plants upon which they are operating, and more particularly to one adapted for use in fields of cotton to gather therefrom the destructive cotton-boll weevil.

The cotton-weevil punctures the blossom or the "boll" and deposits its eggs, which hatch therein and cause the boll to drop; but the young weevils remain and when full grown emerge and attack the bolls again and deposit their eggs as before, and so on, and very soon destroy the crop, the work of these insects continuing over the whole period of growth. Hence the means employed to eradicate them must be adapted to act at different periods of their growth and activity. This pest has caused incalculable loss in cotton-growing countries, and to provide an effectual and inexpensive machine for collecting the insects and the bolls containing them for destruction by fire or other means is the principal object of my invention.

In the accompanying drawings, Figure 1 is a side elevation of one embodiment of my invention. Fig. 2 is a central vertical longitudinal section therethrough. Fig. 3 is a rear elevation. Fig. 4 is a top plan view, and Fig. 5 is a detail elevation showing the collecting-pipes arranged for operating upon young cotton.

Similar characters indicate like parts throughout the several figures of the drawings.

A main axle, designated by the numeral 10, carries at its ends main supporting and driving wheels 11 11. Upon this axle are supported side bars or hounds 12 12, extending to a forward cross-bar 13 and forming therewith and the platform to be hereinafter described the supporting-frame for the elements. At or near the ends of the forward cross-bar are formed sockets 14 14, each receiving a spindle 15 of a bearing-fork 16, in which a small wheel 17 is journaled. To permit vertical adjustment of the forward end of the frame and devices which it carries with relation to the ground, the spindle is preferably movably secured in the socket by a set-screw 18, and to allow the machine to turn readily the bearing is swiveled upon the spindle at 19. To the cross-bar is secured suitable draftrigging 20, preferably for two animals, both said animals and the wheels being so separated that they may operate between the rows of cotton.

Upon the side and cross bar is mounted a platform 21, carrying a casing or receptacle 22 of suitable size and preferably extending beyond the edge. This receptacle conveniently in its overhanging lower portion is provided with a hinged door 23, fastened by a hook 24 or the like and serving to allow the removal of the contents of the receptacle. An inclined wall 25 within the receptacle extends from the forward wall to the edge of the door to direct material thereto. At the top of the casing a driver's seat 26 may be placed, and near it through the upper wall is shown an opening closed by a cover 27 to permit inspection of the interior when desired.

From the rear wall of the box near the top projects a pipe or hollow head 28, and from each side of this head extends an elbow 29, with its outer end extending downward. The distance between these ends may be substantially equal to the distance between adjacent rows of cotton. To the elbows are preferably secured flexible sections $29^a$, of leather or like material, and into pipe-section $29^b$ below the flexible sections telescope depending pipes or conduits 30, vertically adjustable therein and retained in position by set-screws or other suitable securing devices 31. At the lower end each pipe 30 is provided with a flattened mouthpiece 32, having considerable lateral extension.

Upon the platform just in front of the receptacle is mounted a suction-fan 33, connected at its eye by a pipe 34 to a hollow head 35, situated in the front wall opposite the head 28. Across the opening from the receptacle into this head is placed a sheet of gauze or perforated metal 35ᵃ to prevent material from being drawn out of the receptacle into the fan. The outlet 36 of the fan extends down through the platform toward the ground and has at each side guard-wings 37, fastened to the frame. The fan-shaft 38 carries a pinion 39, connected by intermediate gearing with a gear 40, secured through arms 41 to the spokes of one of the wheels 11. The intermediate gearing may be carried upon a frame 42, secured to the frame and receptacle, and may comprise three shafts, each designated as 43 and carrying a pinion 44 and gears 45, intermeshing to form a train of speed-up gearing, the elements of which may be so proportioned or the number of these elements so varied as to give the desired speed of rotation to the fan.

In advance of the blast-outlet of the fan and the suction-conduits is a sweep 46, which is preferably in the form of a broom and is shown as hinged at 47 beneath the platform.

The machine should be first used upon the starting of the weevil upon the young cotton. It is driven along the rows with the sweep lowered and operating over the rows to dislodge weevils. At this time the mouthpieces are preferably crossed or joined, as is illustrated in Fig. 5, to act together directly upon the plants to draw up the weevils by the suction into the receptacle. Later, when the bolls have become loosened through the effect of the insects upon them and these are attacking the more matured heads, the sweep is either removed or turned upward under the framework and secured, and the suction-pipes are allowed to hang separately with the mouthpieces acting between the rows to draw up bolls and squares with the worms. The downward blast from the fan at 36 acting in advance of the collecting mechanism serves at all times to blow off loose bolls and other parts attacked by the weevils, so that the suction may gather them from the ground. The distance from the ground and plant of both the blast-delivery and sweep constituting the dislodging devices may be varied to some extent by the adjustment of the ground-wheels toward and from the frame. By this means the plants may be treated throughout the whole period of time during which the insects act upon them and the machine adjusted to the changing conditions and circumstances not only of the growth of the plants, but also of the growth and habits of the insects. The flexible sections 29ᵇ provide for the adjustment of the enlarged receiving ends 32 to any part of the growing plants, and thus enable the insects to be removed from all parts of the plants and during all periods of the growth.

The device may be modified in minor details and enlarged or decreased in size, as may be required, without affecting the principle of the invention or sacrificing any of its advantages.

Having thus described my invention, I claim—

1. The combination with a movable receptacle, of a supporting-frame, a conduit having a mouthpiece extending into proximity with the objects to be operated upon, means for creating suction through said conduit, and a sweep connected hingedly with the frame in advance of the mouthpiece.

2. The combination with a movable receptacle, of a conduit having a mouthpiece extending into proximity with the objects to be operated upon, means for creating a suction through the conduit, and means for delivering a blast in advance of the mouthpiece.

3. The combination with a movable receptacle, of a conduit having a mouthpiece extending into proximity with the objects to be operated upon, means for creating a suction through the conduit, means for delivering a blast in advance of the mouthpiece, and a sweep operating in advance of the blast-delivery.

4. The combination with a frame supported by wheels, of a receptacle mounted upon the frame, conduits extending from the receptacle toward the ground, means for raising material through the conduits, and a sweep hinged near the forward portion of the frame.

5. The combination with a frame supported upon wheels, of a receptacle mounted upon the frame, conduits extending from the receptacle toward the ground, a casing connected at its inlet with the receptacle, a foraminous separating-piece between the casing and the receptacle, a fan within the casing, a spout upon the latter directing the discharge from the fan downwardly in advance of the conduits, and means for operating the fan.

6. The combination with a frame supported upon wheels, of a receptacle mounted upon the frame, conduits extending from the receptacle toward the ground, means for raising material through the conduits, a dislodging device projecting downwardly from the frame, and means for adjusting the height of the frame.

7. The combination with a frame having a platform, of pairs of rear and forward wheels, collecting mechanism situated at the rear of the frame, a dislodging device located near the forward part of the frame, and means for adjusting the distance between the forward wheels and the platform.

8. An insect-destroying apparatus comprising a truck, a driving-shaft with wheels rotating therewith, a fan and casing therefor, geared connections between the driving-shaft and fan, a pneumatic passage-way, a nozzle at one end thereof adapted to direct the current issuing therefrom against the plants upon which the insects appear, and pipes communicating with the casing and through which the insects are drawn by suction and a screen positioned in said passage-way and adapted to separate the insects from the pneumatic current, and means for collecting the insects.

In testimony that I claim the foregoing as my own I have hereto affixed my signature in the presence of two witnesses.

WALTER M. BOLEN.

Witnesses:
   S. A. McCLELLAN,
   G. R. CARROLL.